United States Patent
Kim et al.

(10) Patent No.: US 9,879,587 B2
(45) Date of Patent: Jan. 30, 2018

(54) DIAGNOSING OXIDATION CATALYST DEVICE WITH HYDROCARBON STORAGE

(71) Applicant: GM GLOBAL TECHNOLOGY OPERATIONS LLC, Detroit, MI (US)

(72) Inventors: Chang H. Kim, Gyeonggi-Do (KR); Michelle H. Wiebenga, Ann Arbor, MI (US); Vincent J. Tylutki, Livonia, MI (US); David B. Brown, Brighton, MI (US); Igor Anilovich, Walled Lake, MI (US); Rahul Mital, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 14/921,722

(22) Filed: Oct. 23, 2015

(65) Prior Publication Data

US 2017/0114696 A1  Apr. 27, 2017

(51) Int. Cl.
*F01N 11/00* (2006.01)
*F01N 3/10* (2006.01)

(52) U.S. Cl.
CPC .......... *F01N 11/002* (2013.01); *F01N 3/103* (2013.01); *F01N 2560/06* (2013.01)

(58) Field of Classification Search
CPC ..... F01N 11/002; F01N 3/103; F01N 2560/06
USPC ......................................................... 60/277
See application file for complete search history.

(56) References Cited

U.S. PATENT DOCUMENTS

| | | | |
|---|---|---|---|
| 7,546,761 B2 | 6/2009 | He et al. | |
| 8,495,864 B2 | 7/2013 | Larose, Jr. et al. | |
| 8,607,546 B2 | 12/2013 | Sun | |
| 8,800,267 B2 | 8/2014 | Larose, Jr. et al. | |
| 2012/0186226 A1* | 7/2012 | Ren | F01N 3/103 60/274 |
| 2012/0216507 A1* | 8/2012 | Nieuwstadt | F01N 3/101 60/274 |
| 2012/0304627 A1 | 12/2012 | Gonze et al. | |
| 2013/0074477 A1 | 3/2013 | Kim et al. | |
| 2013/0086886 A1 | 4/2013 | Gonze et al. | |
| 2013/0139490 A1* | 6/2013 | Tylutki | F01N 11/00 60/277 |
| 2013/0283767 A1 | 10/2013 | Jackson et al. | |
| 2015/0000643 A1* | 1/2015 | Green | F02M 21/0215 123/526 |
| 2015/0068295 A1* | 3/2015 | Kowalkowski | F01N 11/002 73/114.75 |
| 2015/0071823 A1* | 3/2015 | Tylutki | F01N 3/2066 422/119 |
| 2015/0101317 A1* | 4/2015 | Phillips | F01N 11/002 60/299 |

FOREIGN PATENT DOCUMENTS

GB   2467970 A   8/2010

* cited by examiner

*Primary Examiner* — Jason Shanske
(74) *Attorney, Agent, or Firm* — Cantor Colburn LLP

(57) ABSTRACT

A method for diagnosing an Oxidation Catalyst (OC) device of an exhaust gas treatment system is provided. The method monitors a differential temperature across the OC device. The method determines whether the differential temperature reveals a temperature spike. The method determines that the OC device operates properly in response to determining that the differential temperature reveals a temperature spike.

18 Claims, 5 Drawing Sheets

DIAGNOSING OXIDATION CATALYST DEVICE WITH HYDROCARBON STORAGE

FIELD OF THE INVENTION

The subject invention relates to diagnosing an exhaust gas treatment system and, more specifically, to diagnosing an oxidation catalyst (OC) device of an exhaust gas treatment system.

BACKGROUND

Manufacturers of internal combustion engines, particularly diesel engines, are presented with the challenging task of complying with current and future emission standards for the release of nitrogen oxides, particularly nitrogen monoxide, as well as unburned and partially oxidized hydrocarbons, carbon monoxide, particulate matter, and other particulates. In order to reduce the emissions of internal combustion engines, an exhaust gas treatment system is used to convert certain, or all of these exhaust constituents into non-regulated exhaust gas components and reduce particulates from the exhaust gas flowing from the engine.

An exhaust gas treatment system typically includes one or more treatment devices, such as oxidation catalyst (OC) devices, selective catalyst reduction devices, particulate filters, mixing elements and urea/fuel injectors. Some emission standards mandate that these components of an exhaust gas treatment system have separate diagnoses, specifically a separate diagnosis for an OC device. Therefore, a diagnostic scheme for diagnosing an OC device is desirable.

SUMMARY OF THE INVENTION

In one exemplary embodiment of the invention, a method for diagnosing an Oxidation Catalyst (OC) device of an exhaust gas treatment system is provided. The method monitors a differential temperature across the OC device. The method determines whether the differential temperature reveals a temperature spike. The method determines that the OC device operates properly in response to determining that the differential temperature reveals a temperature spike.

In another exemplary embodiment of the invention, a diagnostic system is provided. The diagnostic system comprises an Oxidation Catalyst (OC) device disposed in an exhaust gas treatment system of a vehicle. The diagnostic system further comprises a control module. The control module is configured to monitor a differential temperature across the OC device. The control module is further configured to determine whether the differential temperature reveals a temperature spike. The control module is further configured to determine that the OC device operates properly in response to determining that the differential temperature reveals a temperature spike.

In yet another exemplary embodiment of the invention, an exhaust gas treatment system for an engine of a vehicle is provided. The exhaust gas treatment system comprises an Oxidation Catalyst (OC) device disposed in an exhaust gas treatment system, a first temperature sensor disposed upstream of the OC device, a second temperature sensor disposed downstream of the OC device and a control module. The control module is configured to determine a differential temperature across the OC device based on temperatures sensed by the first and second temperature sensors. The control module is further configured to determine whether the differential temperature reveals a temperature spike. The control module is further configured to determine that the OC device operates properly in response to determining that the differential temperature reveals a temperature spike.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
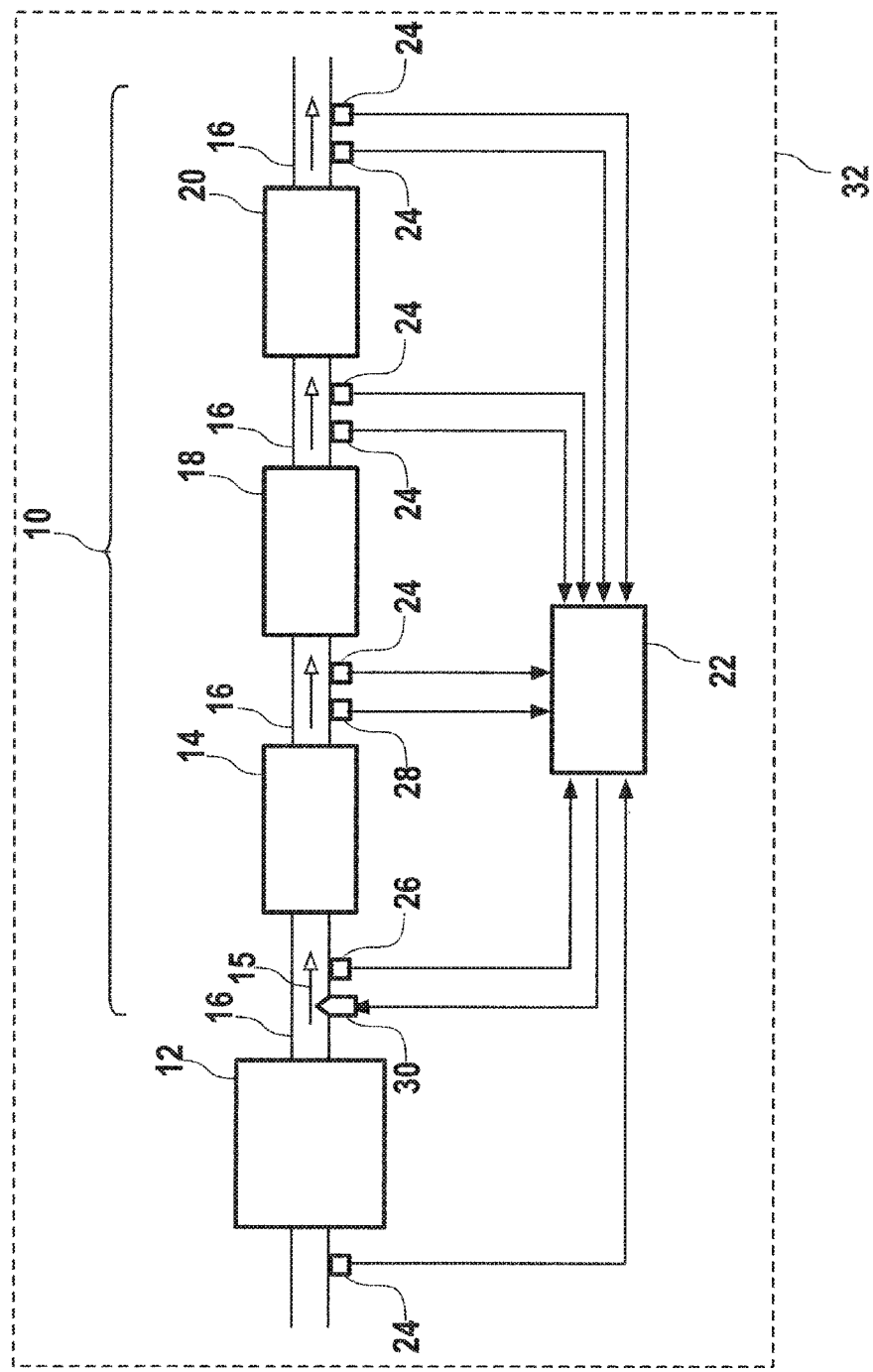
FIG. 1 depicts a functional block diagram of a vehicle including an exhaust gas treatment system in accordance with exemplary embodiments.

The following description is merely exemplary in nature and is not intended to limit the present disclosure, its application or uses. It should be understood that throughout the drawings, corresponding reference numerals indicate like or corresponding parts and features.

As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

In accordance with an exemplary embodiment of the invention, FIG. 1 depicts an exhaust gas treatment system 10 for the reduction of regulated exhaust gas constituents of an internal combustion engine 12, including an engine of a vehicle 32 as well as engines used in various non-vehicular applications. As can be appreciated, the engine 12 can be of any engine type including, but not limited to, a diesel engine, a gasoline engine, a homogeneous charge compression ignition engine, or other engine type.

The exhaust gas treatment system 10 generally includes one or more exhaust gas conduits 16, and one or more exhaust gas treatment devices. In various embodiments, the exhaust gas treatment devices may include an oxidation catalyst (OC) device 14, a selective catalytic reduction (SCR) device 18, a particulate filter (PF) 20, and a hydrocarbon (HC) injector 30 and/or other treatment device (not depicted).

The exhaust gas conduits 16 transport exhaust gas 15 from the engine 12 to the various exhaust gas treatment devices of the exhaust gas treatment system 10. The exhaust gas 15 flows through the exhaust gas treatment system 10 for the removal or reduction of particulates and is then released into the atmosphere.

The OC device 14 may include a flow-through metal or ceramic monolith substrate that is wrapped in a mat or other suitable support that expands when heated, securing and insulating the substrate. The substrate may be packaged in a stainless steel shell or canister having an inlet and an outlet in fluid communication with exhaust gas conduits or passages. An oxidation catalyst compound may be applied as a wash coat and may contain platinum group metals such as platinum (Pt), palladium (Pd), rhodium (Rh) or other suitable oxidizing catalysts, which can operate efficiently to treat unburned gaseous and non-volatile hydrocarbon (HC) and carbon monoxide (CO), which are oxidized to form carbon dioxide ($CO_2$) and water ($H_2O$). The OC device 14 also oxidizes a portion of the nitrogen oxide (NO) to nitrogen dioxide ($NO_2$). The OC device 14 may also incorporate a zeolite component into the wash coat to trap or store hydrocarbons that would otherwise be emitted at low temperatures (e.g., during a cold start or engine idling—below 200 degrees Celsius). In embodiments, the zeolite component of the OC device 14 includes zeolite-Beta (Ti-Beta) and/or zeolite-SSZ-33 (Ti-SSZ-33).

The SCR device 18 may include a flow-through ceramic or metal monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits. The substrate may include an SCR catalyst composition applied thereto. The SCR catalyst composition may contain a zeolite and one or more base metal components such as iron (Fe), cobalt (Co), copper (Cu) or vanadium (V) which can operate efficiently to convert NOx constituents in the exhaust gas 15 in the presence of a reductant such as ammonia ($NH_3$). The zeolite component in the SCR catalyst composition is capable of storing ammonia.

The particulate filter (PF) 20 may be disposed downstream of the SCR device 18. The PF 20 operates to filter the exhaust gas 15 of carbon and other particulates. In embodiments, the PF 20 may be constructed using a ceramic wall flow monolith filter that is wrapped in an intumescent mat or other suitable support that expands when heated, securing and insulating the filter. The filter may be packaged in a rigid shell or canister that is, for example, constructed of stainless steel, and that has an inlet and an outlet in fluid communication with exhaust gas conduits. The ceramic wall flow monolith filter may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter through the inlet ends of the inlet passages is forced to migrate through adjacent longitudinally extending walls to the outlet passages. It is through this exemplary wall flow mechanism that the exhaust gas 15 is filtered of carbon (soot) and other particulates. The filtered particulates are deposited on the longitudinally extending walls of the inlet passages and, over time, will have the effect of increasing the exhaust gas backpressure experienced by the internal combustion engine 12. The accumulation of particulate matter within the PF 20 is periodically removed by cleaning or regeneration to reduce backpressure. Regeneration involves the oxidation, or burning, of accumulated carbon and other particulates in what is typically a high temperature (>600° C.) environment.

The OC device 14, the SCR device 18 and the PF 20 may each have a selected operating temperature at which the device effectively and efficiently removes particulates or alters the exhaust gas 15. For example, the SCR device 18 has an operating temperature for exhaust gas 15 received at which the device converts NO to $N_2$ at or above the selected temperature. In addition, the OC device 14 may be used to combust HC in an exothermic reaction that is effective to combust the accumulated particulates in the PF 20. Initiation of the PF 20 regeneration typically occurs at a selected operating temperature, where an exothermic reaction caused by high exhaust gas temperature combusts or oxidizes accumulated particulates.

At engine start up, the exhaust gas treatment devices may be at or near ambient temperature, which is typically too low for operation of those devices. In addition, the temperatures of the exhaust gas treatment devices may not, depending on engine operation, consistently be above their respective operational temperatures. The temperatures of the exhaust gas treatment devices are therefore increased by driving up the temperature of the exhaust gas, when necessary. In embodiments, the HC injector 30 injects additional fuel upstream of the OC device 14 so that the fuel burns in the OC device 14 to temporarily increase the exhaust gas temperature. Alternatively or conjunctively, a post injection strategy may be employed to temporarily increase the exhaust gas temperature by injecting additional fuel into the cylinder(s) of the engine 12.

A control module (or a controller) 22 controls the engine 12 and/or one or more exhaust components based on sensed and/or modeled data. The data can be received from several sensors 24, 26, and 28 of the exhaust gas treatment system 10. In various embodiments, the sensed and/or modeled data include exhaust gas temperature, exhaust flow rates, soot loads, NOx concentrations, exhaust gas constituencies (chemical composition), differential pressures and many other parameters. In embodiments, the sensors 24-28 are disposed at different locations of the exhaust gas treatment system 10. For simplicity of description, the sensors 24 are assumed to sense and/or model the above parameters, and the sensors 26 and 28 disposed upstream and downstream of the OC device 14 are assumed to be temperature sensors that sense the exhaust gas temperature upstream and downstream of the OC device, respectively.

The control module 22 is configured to perform selected processes or operations based on the sensed and/or modeled data, such as diagnosing the OC device 14. In embodiments, the control module 22 determines whether the OC device 14 operates properly based on whether the temperature differential between the inlet and outlet of the OC device 14 reveals a temperature spike. In particular, the control module 22 determines that the OC device 14 operates properly if the differential temperature reveals a temperature spike. Otherwise, the control module 22 determines that the OC device 14 does not operate properly. In embodiments, existence of a temperature spike in the differential temperature is interpreted to mean that the zeolite component of the OC device 14 stores hydrocarbons as expected.

It is to be noted that the exhaust gas treatment system 10 should not be limited to the configuration illustrated in FIG. 1. For instance, the exhaust gas treatment devices 14-20 may be disposed in the exhaust gas treatment system in an order that is different than the depicted order of the OC device 16, the SCR device 18, and then the PF 20. As an example, the SCR device 18 may be disposed downstream of the PF 20. Moreover, there may be more, less, or different exhaust gas treatment devices disposed in the exhaust gas treatment system 10. For example, the SCR device and the PF 20 may be configured to be a single device (e.g., in a single canister). As another example, another OC device may be disposed between the SCR device 18 and the PF 20. In this case, additional sensors may be placed between the additional OC device and the PF 20.

Figure 2:
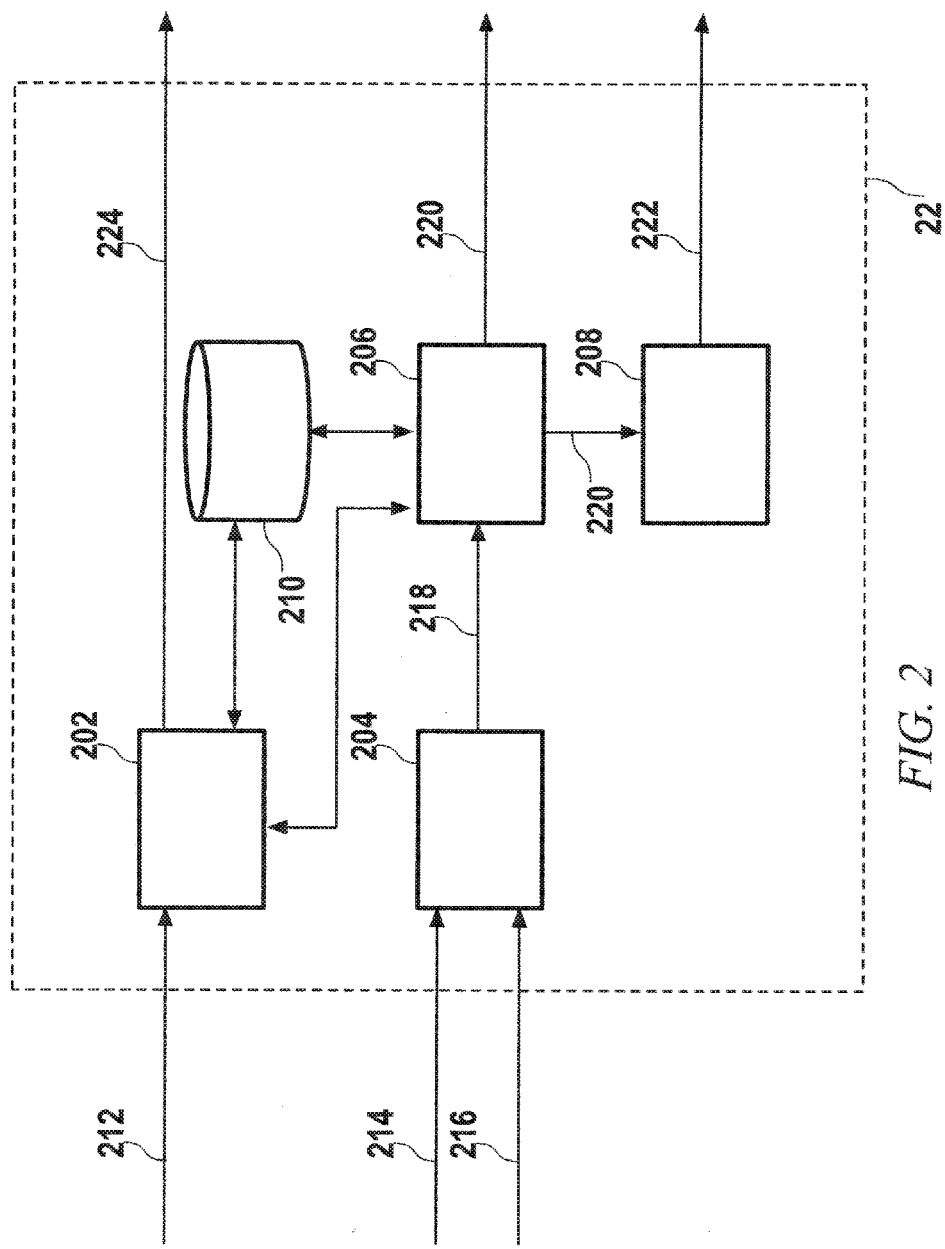
FIG. 2 depicts a dataflow diagram illustrating a controller of the exhaust gas treatment system of FIG. 1 in accordance with exemplary embodiments.

Referring now to FIG. 2, a dataflow diagram illustrates various embodiments of the control module 22 of the exhaust gas treatment system 10 of FIG. 1. Various embodiments of the control module 22 according to the present disclosure may include any number of sub-modules. As can be appreciated, the sub-modules shown in FIG. 2 may be combined and/or further partitioned. Inputs to the control module 22 may be sensed from the sensors 24-28 of FIG. 1 as well as other sensors (not shown) within the vehicle 32, received from other control modules (not shown), and/or determined/modeled by other sub-modules (not shown) within the control module 22. In various embodiments, the control module 22 includes a fuel injection control module 202, a temperature determination module 204, an exothermic analysis module 206, a reporting module 208, and a parameters repository 210, among other sub-modules (not depicted).

The parameters repository 210 stores various different parameters of the vehicle 32. For example, those parameters include operating parameters of the exhaust gas treatment devices of the exhaust gas treatment system 10. The sub-modules of the control module 22 use the parameters to determine and generate different control signals. The values of the parameters stored in the parameters repository 210 may be predefined or updated dynamically by the sub-modules of the control module 22 or other modules of the vehicle 32.

The fuel injection control module 202 determines the amount of HC to inject upstream of the OC device 14 as well as the injection timing. In embodiments, the fuel injection control module 202 determines the amount of HC to inject based on a number of different parameters of the vehicle 32. The parameters that the fuel injection control module 202 uses to determine the amount of HC include the amounts and ages of different oxidation catalyst compounds of the OC device 14 and other operating parameters (e.g., size, composition, etc.) of the OC device 14. The determined amount of fuel to inject is used by the exothermic analysis module 206 for determining whether the OC device 14 operates properly, as will be described further below. The fuel injection control module 202 also generates and sends one or more control signals 224 to the HC injector 30 and/or the fuel injector for injecting HC into the engine 12.

In embodiments, the fuel injection module 202 monitors the temperature 212, which may be the upstream temperature of the OC device 14 or the temperature of the OC device 14. If the temperature 212 falls below a threshold temperature (e.g., the operating temperature of the OC device 14), the fuel injection module 202 controls the HC injector 30 and/or the fuel injector for injecting fuel to the engine 12 to increase the HC in the exhaust gas upstream of the OC device 14 by the determined amount of HC. The increased amount of HC flow into the OC device 14. The temperature 212 may stay below or fall below the threshold temperature during a cold start of the engine 12 or when the engine 12 idles.

The differential temperature determination module 204 receives the upstream or inlet temperature 214 of the OC device 14 from the sensor 26 and the downstream or outlet temperature 216 of the OC device 14 from the sensor 28. In embodiments, the differential temperature determination module 204 determines the differential temperature across the OC device 14 by subtracting the upstream temperature 214 from the downstream temperature 216. That is, the differential temperature across the OC device 14 corresponds to the heat generated by the HC combusted in the OC device 14. The differential temperature 218 across the OC device 14 is outputted to the exothermic analysis module 206.

The exothermic analysis module 206 determines whether the OC device 14 operates properly based on the differential temperature 218. Specifically, in embodiments, the exothermic analysis module 206 determines that the OC device 14 operates properly if the differential temperature 218 reveals a temperature spike after the amount of fuel determined by the fuel injection control module 202 is injected upstream of the OC device 14. If the differential temperature 218 does not reveal a temperature spike, the exothermic analysis module 206 determines that the OC device 14 does not operate properly.

As described above, the zeolite component of the OC device 14 stores hydrocarbons when the OC device 14 is not heated enough to combust the HC in the exhaust gas going through the OC device 14. When the temperature of the OC device 14 reaches an ignition temperature, the HC stored by the zeolite component of the OC device 14 is released and starts to combust and therefore produces a temperature spike in the differential temperature across the OC device 14. When the zeolite component of the OC device 14 is depleted or sintered as the OC device 14 ages, the differential temperature across the OC device 14 would reveal a smaller temperature spike and eventually no temperature spike at all. The exothermic analysis module 206 determines proper operation of the OC device 14 based on whether the differential temperature indicates that the zeolite component of the OC device 14 stores an expected amount of hydrocarbon manifested as a temperature spike in the differential temperature 218.

Figure 3:
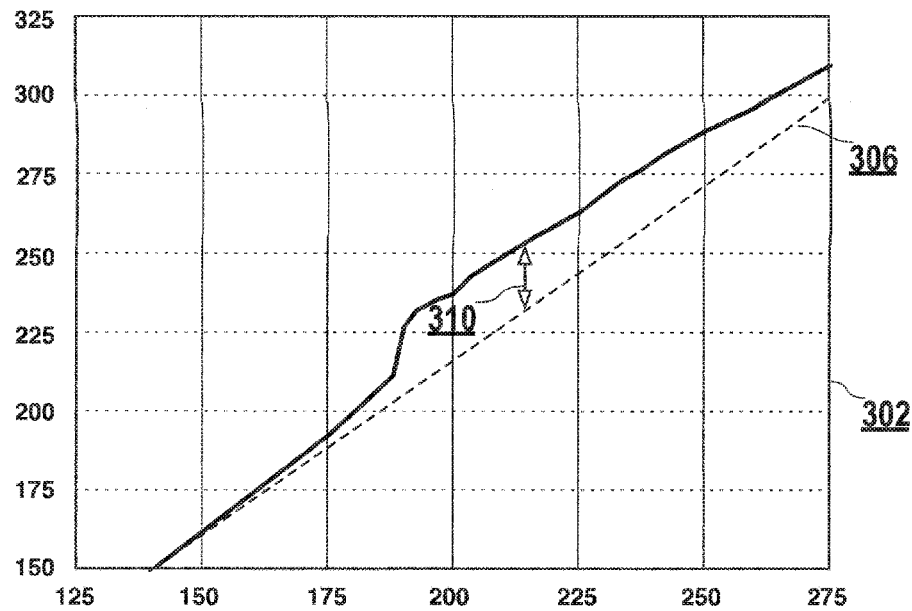
FIG. 3 depicts several graphs illustrating different temperature difference profiles in accordance with exemplary embodiments.
Figure 3:
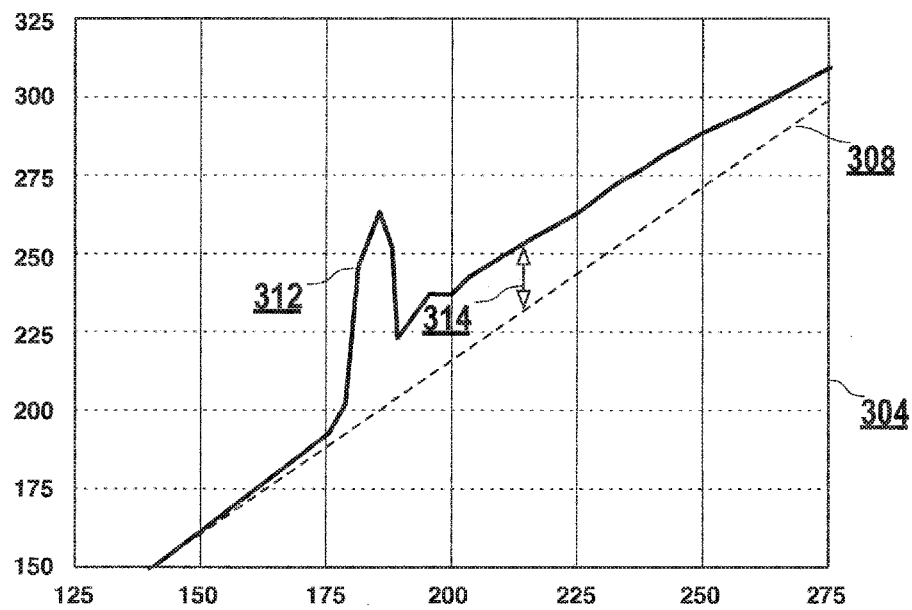

FIG. 3 shows two temperature profiles of the differential temperature across an OC device as graphs 302 and 304. Specifically, the graph 302 is a temperature profile of an OC device that does not have a zeolite component or when the zeolite component is depleted. The graph 304 is a temperature profile of an OC device when its zeolite component stores hydrocarbons as expected. The x-axes of the graphs show the respective upstream or inlet temperatures of the OC devices, and the y-axes of the graphs show the respective downstream or outlet temperatures of the OC devices. As shown, the graph 304 indicates that the differential temperature across the OC device should reveal a temperature spike if the zeolite component of the OC device stores HC at low temperatures.

As the engine operates and sends exhaust gas 15 to the OC device, the temperatures of the OC device (i.e., the inlet and outlet temperatures of the OC device) should rise. The outlet temperatures are expected to be steadily higher than the inlet temperatures due to the exothermic reactions oxidizing the exhaust gas as indicated by the dotted lines 306 and 308. When the temperature of the OC device without a zeolite component reaches an operating temperature of the OC device, the differential temperature increases due to the exothermic oxidation of CO and unburned HC over the surface of the catalyst element in the OC device as indicated by the bidirectional arrow 310 in the graph 302. On the other hand, when the temperature of the OC device that has a zeolite component reaches the operating temperature, the differential temperature reveals a temperature spike 312 because the zeolite releases the stored HC, which starts to combust at an igniting temperature for the HC. That is, a temperature spike of the differential temperature represents the heat generated from combusting the HC that had been stored by the zeolite component. In other words, the temperature spike is a function of the amount of the HC stored by the zeolite component. The differential temperature across this OC device stays (i.e., the outlet temperature stays higher than the inlet temperature) after the spike as indicated by the bidirectional arrow 314 because the unburned HC in the exhaust gas combusts in the OC device. Referring back to FIG. 3, the exothermic analysis module 206 will diagnose any loss of zeolite operation by comparing the differential temperature 218 with a temperature profile for the OC device 14 that includes a temperature spike.

Figure 4:
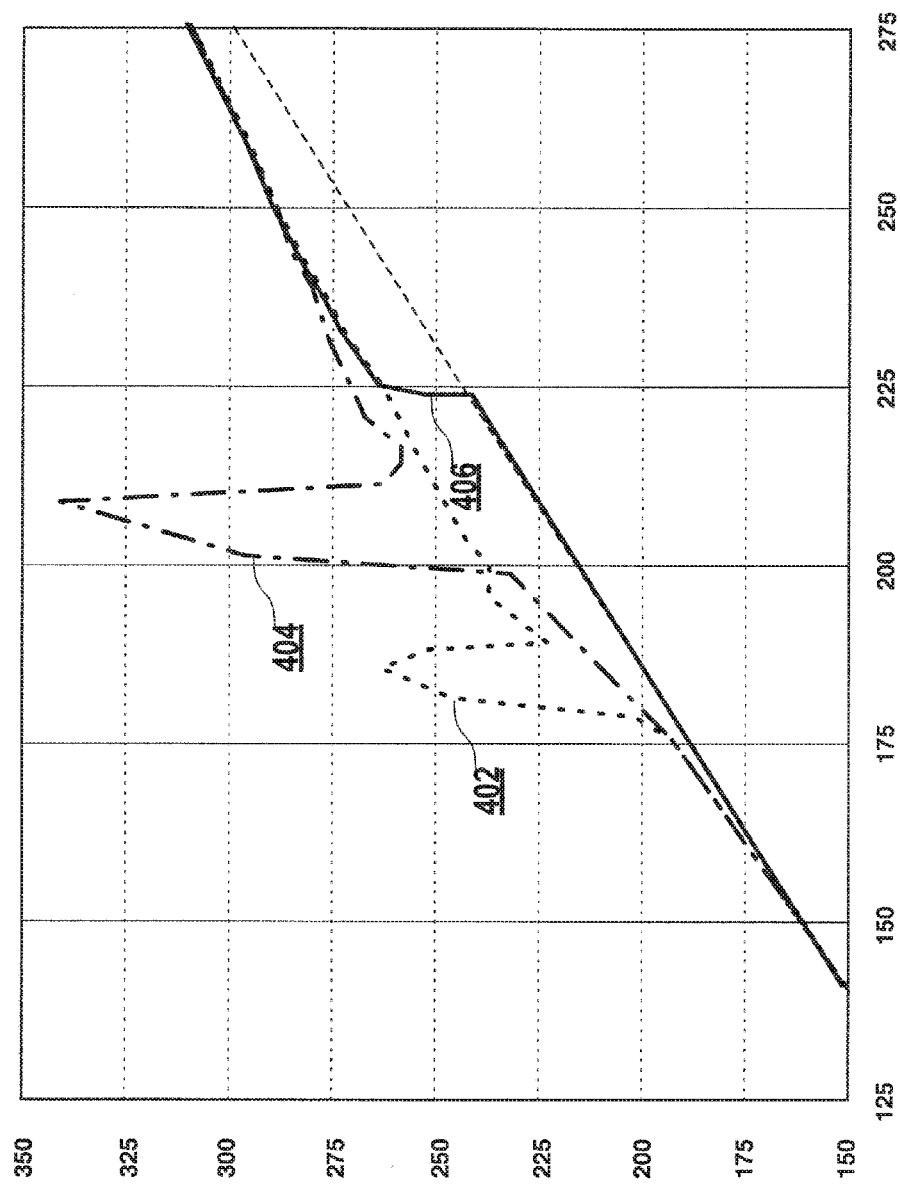
FIG. 4 depicts a graph illustrating different temperature difference profiles in accordance with exemplary embodiments.

FIG. 4 illustrates several temperature profiles 402, 404, and 406 of the differential temperature across an OC device with a zeolite component at different ages of the OC device. Specifically, the temperature profile 402 represents the OC device that is oven-aged for two hours at 600 degrees Celsius, the temperature profile 404 represents an OC device that is oven-aged for 48 hours at 800 degrees Celsius, and the temperature profile 406 represents an OC device that is oven-aged for 48 hours at 1000 degrees Celsius. It is to be noted that these temperature profiles are for a particular OC device with particular configurations—size, capacity, kinds of oxidation substrates being used, amounts of the substrates, etc.

Referring back to FIG. 2, the parameters repository 210 stores different temperature profiles corresponding to different ages of the OC device 14 so that the exothermic analysis module 206 may diagnose the loss of its zeolite operation using these profiles. For instance, in embodiments, the exothermic analysis module 206 may determine the age of the OC device 14 based on the operating parameters of the OC device 14 and select a temperature profile corresponding to the age. Accordingly, the exothermic analysis module 206 may determine if the differential temperature 218 manifests the temperature spike according to the selected temperature profile.

Those skilled in the art will recognize that there are numerous different techniques that may be implemented by the exothermic analysis module 206 to detect a temperature spike. For instance, the exothermic analysis module may be configured to detect a temperature spike without using temperature profiles. As a specific example of detecting a temperature spike without using temperature profiles, the exothermic analysis module 206 may determine whether the outlet temperature of the OC device 14 exceeds a threshold temperature (e.g., 40 degrees Celsius) when the inlet temperature of the OC device 14 is within a particular temperature range (e.g., 200 to 250 degrees Celsius).

Once the exothermic analysis module 206 determines whether the OC device 14 operates properly, the exothermic analysis module 206 outputs the operating status 220 (i.e., proper or improper) of the OC device 14 to the reporting module 208. Based on the status 220, the reporting module 208 sets the value of a diagnostic trouble code (DTC) associated with the OC device 14 and reports the code. In various embodiments, the diagnostic code may be reported by generating a message 222 on a serial data bus (not shown) of the vehicle 32, where the message 222 may be transmitted to a remote location using a telematics system of the vehicle 32 or may be retrieved by a technician tool connected to the vehicle 32. The exothermic analysis module 206 may send the status 220 to a module that controls an in-vehicle indicator to notify the operator of the vehicle 32 of the operation status of the OC device 14.

Figure 5:
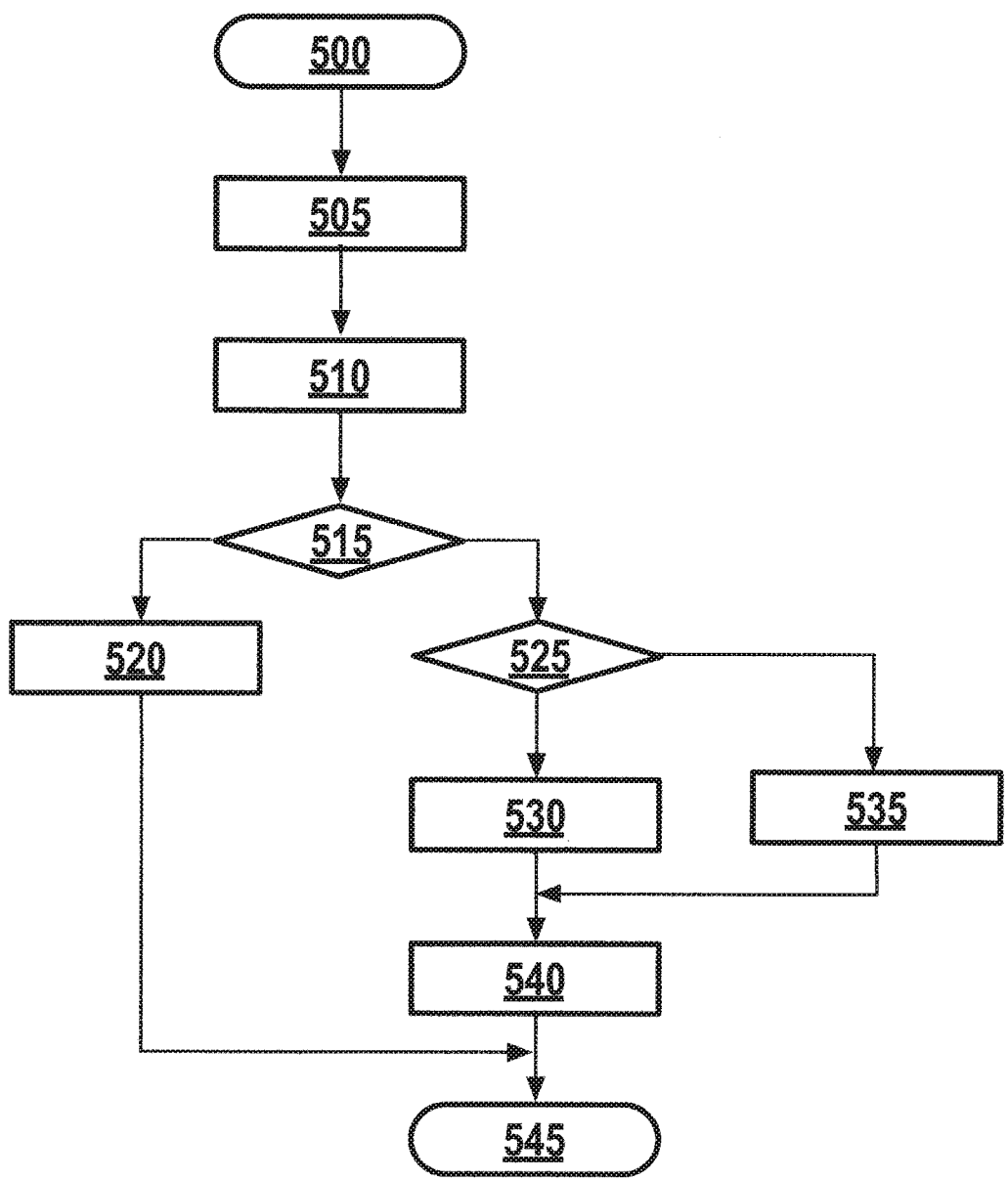
FIG. 5 depicts a flowchart illustrating a method that may be performed by the controller in accordance with exemplary embodiments.

Referring now to FIG. 5, and with continued reference to FIGS. 1 and 2, a flowchart illustrates a method for determining whether an OC device 14 operates properly. In various embodiments, the method can be performed by the control module 22 of FIGS. 1 and 2 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the method can be scheduled to run based on predetermined events, and/or run continually during operation of the engine 12.

In one example, the method may begin at block 500. At block 505, the control module 22 monitors the inlet temperature 214 and the outlet temperature 216 of the OC device 14. In embodiments, the control module 22 determines the differential temperature 218 based on the inlet and outlet temperatures 214 and 216 of the OC device 14.

At block 510, the control module 22 optionally determines an amount of HC to inject upstream of the OC device 14 and the timing of the injection. In embodiments, the control module 22 uses a set of operating parameters of the OC device 14 to determine the amount of fuel to inject and the timing of the injections. The control module 22 may generate and send one or more control signals to the HC injector 30 and/or the fuel injector for injecting fuel into the engine 12.

At block 515, the control module 22 optionally determines whether the differential temperature across the OC device 14 is zero or within a threshold difference from zero when the inlet temperature of OC device 14 is at a relatively high temperature (e.g., 250 degrees in Celsius). If the differential temperature across the OC device 14 is determined to be zero or within a threshold difference from zero, the control module 22 proceeds to block 520 to determine that the OC device 14 does not yet operate properly. Specifically, the control module 22 determines that the OC device 14 is not performing its HC and CO conversion operations as well as its NO conversion operation.

When the control module 22 at block 515 determines that the differential temperature across the OC device 14 is not zero nor within the threshold difference from zero, the control module 22 proceeds to block 525 to determine whether the differential temperature reveals a temperature spike in accordance with a temperature profile of OC device 14 at its age. If the differential temperature reveals a temperature spike, the control module 22 proceeds to block 530 to determine that the OC device 14 operates properly (e.g., that the zeolite component of the OC device 14 stores the HC in the exhaust gas). If the differential temperature does not reveal a temperature spike, the control module 22 proceeds to block 535 to determine that the OC device 14 does not properly operate (e.g., that the zeolite component of the OC device 14 does not store the HC in the exhaust gas).

At block 540, the control module 22 reports the operating status of the OC device 14. In embodiments, the control module 22 generates a diagnostic trouble code (DTC) for the OC device 14 for transmitting remotely via a telematics system or for retrieval by a technician tool. The method may end at block 545.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for diagnosing an Oxidation Catalyst (OC) device of an exhaust gas treatment system of a vehicle, the method comprising:
monitoring a differential temperature across the OC device including a zeolite component for storing hydrocarbons before a temperature of the OC device reaches an operating temperature of the OC device;
determining, by a control module of the exhaust gas treatment system, whether the differential temperature reveals a temperature spike;
determining, by the control module, whether the zeolite component has depleted from the OC device based on the temperature spike so to diagnose whether the OC device operates properly; and
outputting an electronic control signal to an indicator installed on the vehicle, and invoking the indicator in response to the control signal to notify an operator of the vehicle that the OC device is operating improperly due to the depletion of the zeolite component.

2. The method of claim 1, further comprising determining that the OC device does not operate properly in response to determining that the differential temperature does not reveal a temperature spike.

3. The method of claim 2, further comprising generating a message indicating whether the OC device operates properly.

4. The method of claim 3, further comprising transmitting the message from the control module to at least one of a telematics system and a technician tool.

5. The method of claim 1, further comprising determining, via the control module, a temperature spike in the differential temperature indicates that the zeolite component of the OC device stores an expected amount of hydrocarbons corresponding to a current age of the OC device.

6. The method of claim 5, further comprising determining that the zeolite component does not store the expected amount of hydrocarbons in response to detecting that the differential temperature excludes the temperature spike.

7. A diagnostic system, comprising:
an Oxidation Catalyst (OC) device disposed in an exhaust gas treatment system of a vehicle;
an in-vehicle indicator installed on the vehicle; and
a control module configured to:
monitor a differential temperature across the OC device including a zeolite component for storing hydrocarbons before a temperature of the OC device reaches an operating temperature of the OC device;
determine whether the differential temperature reveals a temperature spike;
determine whether the zeolite component has depleted from the OC device based on the temperature spike so to diagnose whether the OC device operates properly; and
output an electronic control signal to an indicator installed on the vehicle, and invoking the indicator in response to the control signal to notify an operator of the vehicle that the OC device is operating improperly due to the depletion of the zeolite component.

8. The diagnostic system of claim 7, wherein the control module is further configured to determine that the OC device does not operate properly in response to determining that the differential temperature does not reveal a temperature spike.

9. The diagnostic system of claim 8, wherein the control module is further configured to generate a message indicating whether the OC device operates properly.

10. The diagnostic system of claim 9, wherein the control module is further configured to connect to at least one of a telematics system and a technician tool for retrieving the message.

11. The diagnostic system of claim 10, wherein the control module determines that the temperature spike in the differential temperature indicates that the zeolite component of the OC device stores an expected amount of hydrocarbons corresponding to a current age of the OC device.

12. The diagnostic system of claim 11, wherein the control module determines the differential temperature without a temperature spike indicates that the zeolite component does not store the expected amount of hydrocarbons.

13. An exhaust gas treatment system for an engine of a vehicle, comprising:
an Oxidation Catalyst (OC) device disposed in an exhaust gas treatment system and including a zeolite component for storing hydrocarbons before a temperature of the OC device reaches an operating temperature of the OC device;
a first temperature sensor disposed upstream of the OC device;
a second temperature sensor disposed downstream of the OC device; and
a control module configured to:
determine a differential temperature across the OC device based on temperatures sensed by the first and second temperature sensors;
determine whether the differential temperature reveals a temperature spike; and
determine whether the zeolite component has depleted from the OC device based on the temperature spike so to diagnose whether the OC device operates properly.

14. The exhaust gas treatment system of claim 13, wherein the control module is further configured to determine that the OC device does not operate properly in response to determining that the differential temperature does not reveal a temperature spike.

15. The exhaust gas treatment system of claim 14, wherein the control module is further configured to generate a message indicating whether the OC device operates properly.

16. The exhaust gas treatment system of claim 15, wherein the control module is further configured to connect to at least one of a telematics system and a technician tool for retrieving the message.

17. The exhaust gas treatment system of claim 15, wherein the control module determines that the temperature spike in the differential temperature indicates that the zeolite component of the OC device stores an expected amount of hydrocarbons corresponding to a current age of the OC device, and determines that the differential temperature excluding the temperature spike indicates that the zeolite component does not store the expected amount of hydrocarbons corresponding to the current age of the device.

18. The method of claim 5, further comprising:
storing a plurality of different temperature spike profiles that are mapped to a stored age value of the OC device;
determining the current age of the OC device;

comparing the temperature spike revealed in the temperature differential to the plurality temperature spike profiles;
determining the depletion of the zeolite component based on the comparison; and
outputting an electronic control signal to an indicator installed on the vehicle, and invoking the indicator in response to the control signal to notify an operator of the vehicle that the OC device is operating improperly due to the depletion of the zeolite component.

* * * * *